United States Patent [19]

Letinski

[11] Patent Number: 4,717,619
[45] Date of Patent: Jan. 5, 1988

[54] PROCESS FOR THE PRODUCTION OF MOLDED POLYBENZIMIDAZOLE ARTICLES AND THE RESULTANT ARTICLES

[75] Inventor: John S. Letinski, Metuchen, N.J.

[73] Assignee: Hoechst Celanese Corporation, Somerville, N.J.

[21] Appl. No.: 792,383

[22] Filed: Oct. 29, 1985

[51] Int. Cl.$^4$ .................. B32B 27/12; B29B 9/04; B29C 39/14; B29C 43/00
[52] U.S. Cl. .................. 428/287; 264/144; 264/239; 264/257; 264/331.11; 428/473.5; 524/606; 528/331; 528/348
[58] Field of Search .................. 264/140, 144, 331.12, 264/331.11, 239, 299, 257; 528/342

[56] References Cited

U.S. PATENT DOCUMENTS

Re. 26,065  2/1966  Marvel et al. .
2,895,948  7/1959  Brinker et al. .
3,933,937  1/1976  Rhodes, Jr. et al. .......... 264/140 X

*Primary Examiner*—Philip Anderson
*Attorney, Agent, or Firm*—Lynch, Cox & Gilman

[57] ABSTRACT

Disclosed herein is a process for the production of shaped polybenzimidazole articles which comprises forming a solvent solution of the polymer, depositing the solution on a support to form a film, removing sufficient solvent from the deposited film such that the film contains from about 10 to about 30 percent by weight of said solvent and compression molding the resulting product into a shaped article. Thus, this invention provides a unique process for the forming of molded shaped articles from polybenzimidazole based polymers.

26 Claims, 1 Drawing Figure

PROCESS FOR THE PRODUCTION OF MOLDED POLYBENZIMIDAZOLE ARTICLES

PROCESS FOR THE PRODUCTION OF MOLDED
POLYBENZIMIDAZOLE ARTICLES

PROCESS FOR THE PRODUCTION OF MOLDED POLYBENZIMIDAZOLE ARTICLES AND THE RESULTANT ARTICLES

BACKGROUND OF INVENTION

1. Field of Invention

This invention relates to a process for producing polybenzimidazole products. More particularly, the invention relates to the production of thermoplastic polybenzimidazole shaped articles.

2. Prior Art

It is recognized that polybenzimidazoles in general and particularly aromatic polybenzimidazoles are characterized by a high degree of thermal stability. In the prior art, polybenzimidazole has been formed into fibers and membranes of wide utility which are highly resistant to heat degradation and chemical attacks.

Polybenzimidazole has also been formed into membranes useful in reverse osmosis or ultrafiltration processes. See, U.S. Pat. Nos. 3,699,038, 4,020,142, 4,385,148 and 4,512,894. A process for the production of polybenzimidazole semipermeable flat films and fibers is also dislosed in several patents. See, for example, U.S. Pat. Nos. 4,020,142 and 4,512,894.

However, in the prior art no process was disclosed for the production of molded polybenzimidazole shaped articles since the prior art polybenzimidazole polymers were intractable and thus incapable of being molded. Moreover, powders of prior art polybenzimidazoles, even when subjected to high temperature molding processes, would retain a powdered consistency and could therefore not be molded.

Also, in prior art processes for the production of polybenzimidazole, the polybenzimidazole is first dissolved in a solvent, such as N,N-dimethylacetamide. As an integral step in the final process for the production of the polybenzimidazole end product in these prior art processes, all or substantially all of that solvent used in the formation of the polybenzimidazole polymer dope was driven off prior to the formation of the desired polybenzimidazole product. Difficulties have often occurred in attempting to drive off this solvent.

It is therefore an object of this invention to provide a process for the production of useful polybenzimidazole products which retain significant amounts of the solvents used in the polybenzimidazole production process.

It is a further object of the invention to produce thermoplastic polybenzimidazole articles.

It is a still further object of the present invention to provide a process for the mixing of polybenzimidazole with assorted fillers and reinforcing aids such as fiber glass, titanium dioxide and graphite to produce fibers, films and shaped articles having enhanced strength properties.

These and other objects, as well as the scope, nature, and utilization of the invention will be apparent to those skilled in the art from the following detailed description and appended claims.

SUMMARY OF INVENTION

The process of the present invention comprises the following steps:
(a) providing a solvent solution of a polybenzimidazole polymer;
(b) depositing said solvent solution upon a support to form a polybenzimidazole polymer film;
(c) removing sufficient solvent from the deposited film such that the film contains solvent in the range of about 10 to 30 percent by weight based on the total film weight;
(d) molding the polybenzimidazole film into a shaped article.

BRIEF DESCRIPTION OF THE DRAWINGS

The invention will now be described with reference to the accompanying drawing in which.

DETAILED DESCRIPTION OF INVENTION

A. The Starting Polymer

Figure 1:
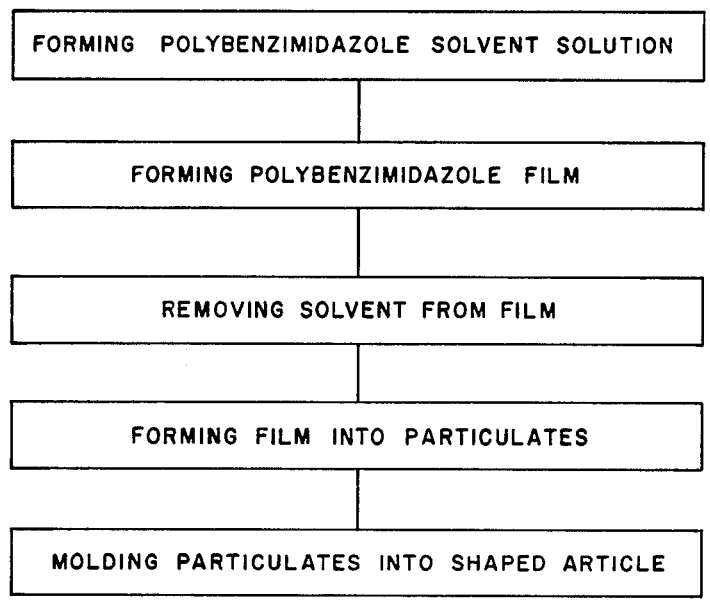
FIG. 1 is a step-by-step schematic of the process for the production of molded polybenzimidazole articles.

The polymeric material utilized to form the films of the present invention is a linear polybenzimidazole. Typical polymers of this class and their preparation are more fully described in U.S. Pat. Nos. 2,895,948, Re. 26,065, and in the Journal of Polymer Science, Vol. 50, pages 511-539 (1961) which are herein incorporated by reference. The polybenzimidazoles consist essentially of recurring units of the following Formulas I and II. Formula I is:

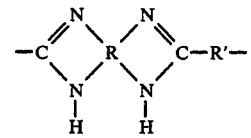

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (3) thiophene, and (f) pyran. Formula II is:

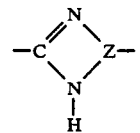

wherein Z is an aromatic nucleus having the nitrogen atoms forming benzimidazole ring paired upon adjacent carbon atoms of the aromatic nucleus.

Preferably, aromatic polybenzimidazoles are selected, e.g., from polymers consisting essentially of the recurring units of Formulas I and II wherein R is an aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho-disposed diamino substitutes and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the group consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'(pyridylene-3",5")-5,5'-bibenzimidazole;
poly-2,2'(furylene-2",5")-5,5'-bibenzimidazole;
poly-2,2'(naphthalene-1",6")-5,5'-bibenzimidazole;
poly,-2,2'-amylene-5,5'-bibenzimidazole;
poly-2,2'-octamethylene-5,5'-bibenzimidazole;
poly-2,6-(m-phenylene)-diimidazobenzene;
poly-2,2'cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2"'(m-phenylene)-5'5"-di(benzimidazole) ethylene-1,2
where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

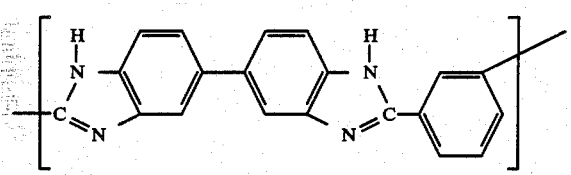

Any polymerization process known to those skilled in the art may be employed to prepare the polybenzimidazole which is utilized to form semipermeable membranes in accordance with the present invention. With respect to aromatic polybenzimidazoles, preferably, equimolar quantities of the nonomeric tetraamine and dicarboxyl compound may be introduced into a first step melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed as deciliters per gram, of at least 0.1, and preferably from 0.13 to 0.3 (determined from a solution of 0.4 grams of the polymer is 100 milliliters of 97 percent $H_2SO_4$ at 25° C.).

After the conclusion of the first stage reaction, which normally takes at least 0.5 hours and preferably 1 to 3 hours, the formed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.25. In a preferred embodiment the inherent viscosity of the polybenzimidazole polymer utilized in this invention is in the range of about 0.25 to 0.7.

The temperature employed in the second stage is at least 250° C., preferably at least 325° C., and more preferably from about 350° to 425° C. The second stage reaction generally takes at least 0.5 hours, and preferably from about 1 to 4 hours or more. It is, of course, also possible to prepare the instant polymers via a one-step reaction. However, the previously-described two-step process is preferred.

B. The Polymer Solution

The solvents utilized to form the polybenzimidazole polymer solution include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethylacetamide, N,N-dimethyl formamide, dimethyl sulfoxide, and N-methyl-2-pyrrolidone. The particularly preferred solvent is N,N-dimethylacetamide.

The polymer solutions may be prepared, for example, by dissolving sufficient polybenzimidazole in the solvent to yield a final solution containing from about 5 to 30 percent by weight of polymer based on the total weight of the solution, and preferably from about 5 to 25 percent by weight.

The quantity of polybenzimidazole dissolved in the solvent should be such that the resulting solution has a viscosity of about 50 to 4,000 poise at 30° C., and preferably about 400 to 600 poise.

One suitable means for dissolving the polymer in the solvent is by mixing the materials at a temperature above the normal boiling point of the solvent, for example, about 25° to 120° C. above such boiling point, and at a pressure of about 2 to 15 atmospheres for a period of about 1 to 5 hours. The resulting solutions are preferably filtered to remove any undissolved polymer.

C. Film Formation

There are several methods by which the intermediary film may be formed. However, the method of preparation of the film is not crucial and many methods well known in the art may be used to prepare the films of the instant invention. In the preferred method, the polybenzimidazole dope is deposited upon a support which may be selected from a wide variety of materials including ceramic, glass or metallic plates (e.g. stainless steel). In addition, previously coated plates such as steel, ceramic or glass plates coated with a teflon or teflon-like materials may also be employed. The support is preferably provided with retaining elements or raised edges whereby the solution is confined to the surface thereof at the desired location until its consistency is such that the retaining elements are no longer needed. Numerous techniques are available for the application of the solution to the support as will be apparent to those skilled in the art. See e.g., U.S. Pat. Nos. 4,020,142, 3,851,025 and 3,699,038. For instance, the polybenzimidazole polymer solution may simply be poured upon a level support in a quantity sufficient for it to assume the desired thickness.

The thickness of the wet film deposited upon the support is not critical to the ultimate product. Generally, the wet film is deposited upon the support in a substantially uniform thickness of about 0.2 to 30.0 mils and preferably about 1 to 15 mils. In a particularly preferred embodiment of the invention, the wet film is deposited in a thickness of about 5 to 10 mils. A quantity of solvents is next evaporated from the wet film to allow the formation of a relatively solid polybenzimidazole polymer film. Generally the polybenzimidazole polymer film will retain about 10 to 30 percent by weight solvent in the polybenzimidazole polymer. In the preferred embodiment the solvent is retained in quantities of about 15 to 25 percent.

The partial evaporation of solvent from the wet film may be accomplished by a variety of techniques as will be apparent to those skilled in the art. For instance, a stream of air or other gas at ambient or at an elevated temperature (e.g. approaching the boiling point of the solvent) may simply be directed at the exposed surface of the wet film. Other methods of evaporation are listed in U.S. Pat. No. 4,512,894 which is hereby incorporated by reference.

In a particularly preferred embodiment the wet polybenzimidazole film is applied to a teflon coated, metallic-based, steam table. The dope is then heated for about 2 hours to about 5 hours to produce a film containing from about 10 to about 30 percent by weight solvent and having a film thickness of about 2 to about 15 mils.

D. Molding Process

After the film has been prepared it may be cut into sections of convenient lengths and stored until it is formed into a product useful in molding processes. In order to form a product which may conveniently be molded, the polybenzimidazole films prepared above are crushed, ground or otherwise formed into particles of sufficiently small size to be used in a mold, such as a compression mold. The size of the particles will depend upon operating and processing conditions of the molding process and the degree of intermixing that may be necessary with added components such as fillers or reinforcing agents. In general, however, it is preferred that the film be ground or broken up into particles. Where the molding of intricately shaped small sized articles is desired, or where a high degree of intermixing with added reinforcing agents is required, about 40 to 100 mesh powders are employed, more preferably about 40 to 60 mesh powders.

Many methods may be employed for grinding the films prepared according to the process described above. Of course, it is necessary that the grinding process be carried out under conditions such that the solvent content of the ground particles does not fall below the minimum limits specified above, (i.e., about 10 percent by weight of solvent). The preferred grinding process for the film prepared according to the process of the instant invention involves breaking the film up into sizes of less than about 1 in. square and adding the broken film to a freezer mill which is surrounded by liquid nitrogen or another cooling media such that the film is ultimately cooled by a media having a low temperature, e.g., about −190° C. to about −210° C. The freezer mill an employ any of a variety of actual grinding processes. In the preferred process the freezer mill employs ultrasonic techniques wherein a grinding device such as a metallic rod is vibrated to break up the film for about 5 to about 30 minutes. The particles which result from this process are non-sintering and are stable, even after having been stored for many months at, or even slightly above, ambient temperatures.

After the polybenzimidazole powder is formed, it is placed in a mold and preferably compression molded using conventional techniques. Generally, the molded material is compression molded at or slightly above the softening range of the polymer for from 10 to about 30 minutes. For the preferred polybenzimidazole polymers this temperature will range from about 180° C. to 260° C., preferably from about 200° C. to about 225° C.

The polybenzimidazole particles described above may be compounded with various fillers, extenders, reinforcing agents and the like, added to the compression mold or another type of mold and molded to produce articles having improved strength properties. Examples of such materials include titanium dioxide, fiberglass, graphite, carbon fibers, various clays and other well known products.

Where large sized articles are molded, the film prepared above may directly be employed if it can conveniently be added to the compression mold or it may be slightly broken up by conventional breakage methods and added directly to the compression mold without actual freezer milling. The film may then be compression molded either alone or with the fillers, reinforcing agent or the like specified above for the same period of time and under the same conditions as specified above.

In yet another use for the films of the instant invention, a "molding sandwich" is formed by combining a layer of fibrous or other reinforcing means, including woven reinforcing fabrics formed from carbon or mineral fibers for example, between two layers of the polybenzimidazole film prepared by the process disclosed above. The resulting sandwich is then compression molded in a press at temperatures and pressures sufficient to soften the polybenzimidazole film.

The resulting molded polybenzimidazole articles have excellent strength properties and are particularly useful in high temperature application where a lack of high temperature deformation is necessary.

The following examples are given as specific illustrations to the invention. It should be understood, however, the invention is not limited to the specific details set forth in the examples.

EXAMPLES

Example 1

A polybenzimidazole dope was prepared containing about 5 percent by weight of a polybenzimidazole polymer prepared from poly-2,2'-(m-phenylene)-5,5'-bibenzimidazole having an inherent viscosity of 0.6 dissolved in a solution of dimethylacetamide. The dope was cast on a teflon coated steel steam table and continuously steam heated at 100° C. for a period of 3 hours. The film formed by this process showed an inconsistent thickness of about 5-10 mils. Gas chromatography analysis of the film showed that the film had retained about 20.3 percent by weight dimethylacetamide. The resulting film was broken up into film shards having a maximum size of about 1 inch square and ground in a freezer mil for 15 minutes under liquid nitrogen at a temperature of −195° C. A uniform 40 mesh powder resulted. This powder was added to a compression mold and molded at a temperature of 200° C. for 20 minutes to produce a polybenzimidazole plug which was well shaped and exhibited good high temperature stability.

Example 2

The 40 mesh powdered product prepared in Example 1 was mixed on a 50 percent by weight basis with graphite fibers and compression molded at a temperature of 230° C. for 20 minutes to produce a shaped article which was electrically conductive and maintained good heat deformation characteristics even when heated to temperatures as high as 150° C.

What is claimed is:

1. A process for the production of shaped polybenzimidazole articles comprising:
   (a) preparing a solvent solution of a polybenzimidazole polymer wherein the inherent viscosity of the polybenzimidazole polymer is in the range of about 0.25 to 0.7;
   (b) forming a film from the solvent solution;
   (c) removing sufficient solvent from the film such that the film retains from about 10 to about 30 percent by weight of the solvent;
   (d) forming the film having retained solvent into particulates of sufficiently small size to be used in a molding process; and
   (e) molding the particles into a shaped article.

2. A process for the production of shaped polybenzimidazole articles comprising:
   (a) preparing a solvent solution of a polybenzimidazole polymer wherein the polybenzimidazole polymer exhibits an inherent viscosity of about 0.25 to 0.7 and wherein the solvent is selected from the group consisting of N,N-dimethylacetamide, N,N-dimethyl formamide, dimethyl sulfoxide and N-methyl-2-pyrrolidone;
   (b) forming a polybenzimidazole polymer film from the solvent solution;
   (c) removing sufficient solvent from the film such that the film retains about 15 to about 25 percent by weight of the solvent;
   (d) forming the film with retained solvent into particulates to a size from about 40 to about 100 mesh; and
   (e) compression molding the particulates with retained solvents, into shaped articles at a temperature from about 180° C. to about 260° C., using a compression mold.

3. A process for the production of shaped polybenzimidazole articles comprising:
   (a) forming a solvent solution of a polybenzimidazole polymer wherein the polybenzimidazole polmyer exhibits an inherent viscosity of about 0.25 to 0.7 and wherein the solvent is selected from the group consisting of N,N-dimethylacetamide, N-N-dimethyl formamide, dimethyl sulfoxide and N-methyl-2-pyrrolidone;
   (b) forming a polybenzimidazole polymer film from the solvent solution;
   (c) removing sufficient solvent from the film such that the film retains about 10 to about 30 percent by weight of the solvent;
   (d) forming the film into a polybenzimidazole polymer particulate; and
   (e) molding the particulate into a shaped article employing a compression molding process.

4. The process of claim 1 wherein the film formed in step (c) is crushed prior to molding.

5. The process of claim 1 wherein the film formed in step (c) is milled to form a polybenzimidazole polymer particulate prior to molding into the shaped article.

6. The process as in any of claims 1, 2, 3, 4 or 5 wherein sufficient solvent is removed from the deposited film such that the film retains about 15 to about 25 percent by weight of the solvent.

7. The process as in any of claims 1, 2, 3, 4 or 5 wherein the film is deposited upon the support to a wet film thickness of about 0.2 to 30.0 mils.

8. The process of claim 7 wherein the film is deposited on the support to a wet film thickness of about 5.0 to about 10.0 mils.

9. The process as in claims 1, 2, 3, 4 or 5 wherein the polybenzimidazole product is mixed with a filler, extender or reinforcing agent prior to molding.

10. The process as in any of claims 1, 2, 3, 4 or 5 wherein the polybenzimidazole product is mixed with graphite prior to molding.

11. The process as in any of claims 1, 2, 3, 4 or 5 wherein a reinforcing means is placed between two layers of the polybenzimidazole film prior to molding.

12. The process of claim 9 wherein the reinforcing means is a reinforcing fabric.

13. The process as in any of claims 1, 2, 3, 4 or 5 wherein the polybenzimidazole polymer consists essentially of recurring units of the formula:

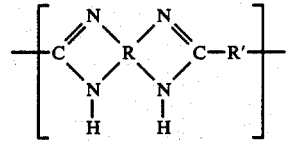

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

14. The process as in any of claims 1, 2, 3, 4 or 5 wherein the polybenzimidazole polymer consists essentially of recurring units of the formula:

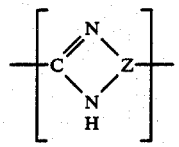

wherein Z is an aromatic nucleus having the nitrogen atoms forming the benzimidazole rings paired upon adjacent carbon atoms of said aromatic nucleus.

15. The process as in any of claims 1, 4 or 5 wherein the polybenzimidazole polymer is poly-2,2'-(m-phenylene)-5,5'-bibenzimidazole.

16. The process as in any of claims 1, 4 or 5 wherein the solvent for the polybenzimidazole polymer is selected from the group consisting of N,N-dimethylacetamide, N,N-dimethylformamide, dimethyl sulfoxide and N-methyl-2-pyrrolidone.

17. The process as in any of claims 1, 2, 3, 4 or 5 wherein the solvent is N,N-dimethylacetamide.

18. The product produced in accordance with the process as in any of claims 1, 2, 3, 4 or 5.

19. The product produced in accordance with the process of claim 6.

20. The product produced in accordance with the process of claim 9.

21. The product produced in accordance with the process of claim 10.

22. The product produced in accordance with the process of claim 11.

23. The product produced in accordance with the process of claim 12.

24. The product produced in accordance with the process of claim 13.

25. The product produced in accordance with the process of claim 14.

26. The product produced in accordance with the process of claim 15.

* * * * *